United States Patent [19]

Kawamura

[11] 4,227,135
[45] Oct. 7, 1980

[54] STEP MOTOR DRIVING CIRCUIT

[75] Inventor: Yoshikazu Kawamura, Suwa, Japan

[73] Assignee: Kabushiki Kaisha Suwa Seikosha, Tokyo, Japan

[21] Appl. No.: 882,516

[22] Filed: Mar. 1, 1978

[51] Int. Cl.$^2$ ............................................... G05B 19/40
[52] U.S. Cl. .................................... 318/696; 318/138
[58] Field of Search ............................... 318/138, 696

[56] References Cited

U.S. PATENT DOCUMENTS

| 3,304,481 | 2/1967 | Saussele | 318/138 |
| 4,055,785 | 10/1977 | Nakajima et al. | 318/696 |
| 4,066,947 | 1/1978 | Nakajima et al. | 318/696 |

Primary Examiner—J. V. Truhe
Assistant Examiner—William L. Feeney
Attorney, Agent, or Firm—Blum, Kaplan, Friedman, Silberman & Beran

[57] ABSTRACT

A step motor driving circuit for selectively effecting a rotational stepping of a rotor in a forward rotational direction or in a reverse rotational direction is provided. The driving circuit is coupled to the drive coil of a motor and is disposable into a first mode for applying, to the drive coil, a first drive signal for effecting a periodic rotation of the rotor in a first rotational direction. The drive circuit is further disposable into a second mode for applying to the drive coil a second drive signal for effecting a periodic rotation of the rotor in the opposite rotational direction. A mode select circuit is coupled to the drive circuit and is adapted to dispose the drive circuit into either a first or second mode to thereby select the direction of rotation of the rotor.

10 Claims, 6 Drawing Figures

PRIOR ART

STEP MOTOR DRIVING CIRCUIT

BACKGROUND OF THE INVENTION

This invention is directed to a step motor driving circuit, and in particular to a step motor driving circuit particularly suited for use in an electronic wristwatch that is capable of driving the clock hands of a wristwatch in a forward direction and in a reverse direction.

In view of the limited space provided in electronic wristwatches for the electronic movement and the battery, it is imperative that the electronic movement consume as little power as possible during operation, in order to prevent a battery from being readily dissipated over long periods of use. Accordingly, efforts are continually made to effect a further reduction in the size of the components of the electronic wristwatch and, at the same time, increase the efficiency of the components. Step motors, utilized in an electronic wristwatch for effecting an incremental driving of the gear train, in response to the electronic timekeeping signals produced by the electronic circuitry, are optimally constructed to obtain greater efficiency and reduced power consumption during operation.

Moreover, because normal timekeeping operations require that the clock hands be advanced in only a clockwise direction, in order to provide an accurate timekeeping function, the emphasis in step motor constructions has been to have same effect an incremental rotation of the clock hands in a single direction, namely, a clockwise direction. Moreover, the emphasis in improving step motors has been in reducing the current consumption of step motors capable of effecting incremental rotation of the step motor in a fixed rotational direction and not to incrementally rotating the rotor in two directions. Accordingly, miniaturized, highly efficient step motors capable of being incorporated in a miniaturized electronic wristwatch movement and further capable of imparting incremental rotary motion in two directions have heretofore not been provided.

Although concepts have been developed for effecting the rotation of a step motor in two directions, these ideas were not practical when incorporated into a miniaturized step motor of the type utilized in an electronic wristwatch. As detailed below, these constructions are often very complex, require highly toleranced components that are difficult to manufacture, and admit of increased power consumption during use. However, it has been found that the number of consumer functions, and hence the convenience and desirability of electronic wristwatches can be increased by providing miniaturized step motors in an electronic wristwatch that are capable of providing incremental rotation in two directions.

SUMMARY OF THE INVENTION

Generally speaking, in accordance with the instant invention, a step motor driving circuit for selectively effecting a rotational stepping of a rotor in a forward rotational direction and in a reverse rotational direction, is provided. The step motor includes a magnetic permeable stator and a drive coil coupled to the stator for magnetically orienting the stator into at least a first magnetic orientation and a second magnetic orientation. A permanent magnet rotor is at least partially surrounded by the stator and is rotated in response to changes in the magnetic orientation of the stator. A driving circuit is coupled to the drive coil and is disposable into a first mode for applying to the drive coil a first drive signal for effecting a periodic rotation of the rotor in a first rotational direction. The driving circuit is disposable into a second mode for applying to the drive coil a second drive signal to effect a period rotation of the rotor in the other rotational direction and a mode select circuit is coupled to the driving circuit and is adapted to selectively dispose the driving circuit into either a first or second mode and thereby select the direction of rotation of the rotor.

Accordingly, it is an object of the instant invention to provide a step motor driving circuit for use in a miniaturized electronic wristwatch for incrementally rotating a rotor in a forward direction or in a reverse direction.

A further object of the instant invention is to provide a highly efficient step motor arrangement for providing forward incremental rotation and reverse incremental rotation that requires a small amount of power to operate same.

Still a further object of the instant invention is to provide a step motor and driving circuit therefor for providing two directional electro-mechanical conversion in an electronic wristwatch.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
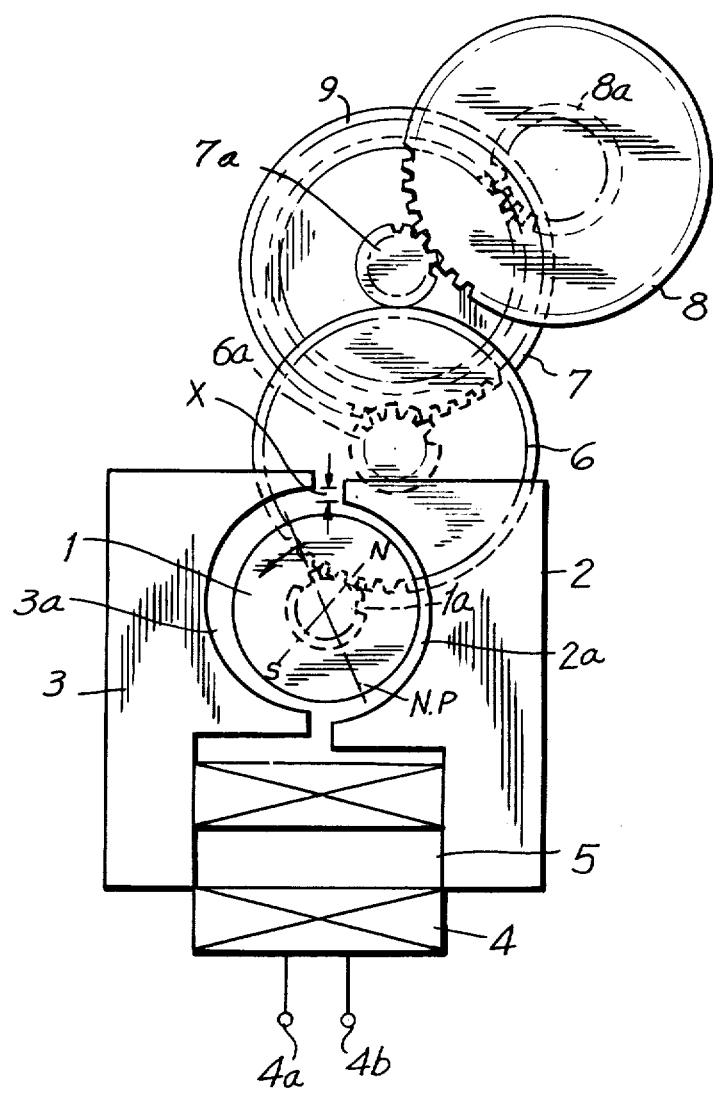
FIG. 1 is a plan view of an electro-mechanical converter mechanism of an electronic wristwatch constructed in accordance with the prior art.

Reference is now made to FIG. 1, wherein a prior art electro-mechanical converter mechanism, for converting the time-keeping signals produced in an electronic wristwatch into an incremental advancement of the gear train, is depicted. The electro-mechanical converter mechanism includes a step motor comprised of an oppositely poled permanent magnet rotor 1 having two stator poles 2 and 3 disposed therearound, a stator yoke 5 connecting the respective stator poles, and a drive coil 4 having terminals 4a and 4b surrounding the yoke. The portion of the stator poles 2a and 3a, surrounding the permanent magnet rotor, are coaxially offset by an amount x with respect to the permanent magnet rotor in order to assure that the rotor is rotated in a predetermined rotational direction. Accordingly, the step motor is operated in a conventional manner by reversing the polarities of both stator poles with respect to each other to thereby effect a rotation of the magnetic rotor through a 180° rotation, in response to each change of polarity of the stator poles.

Figure 2:
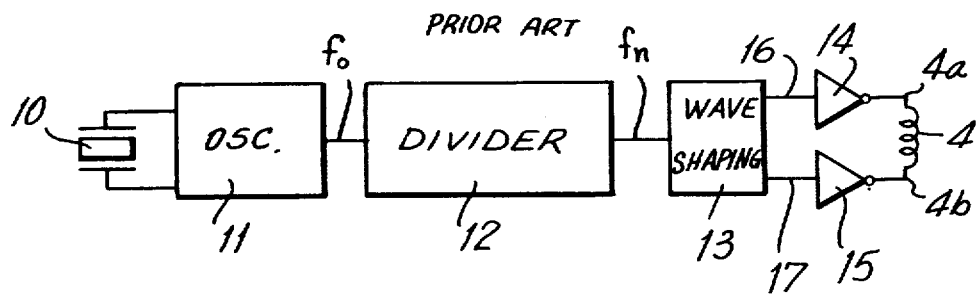
FIG. 2 is a block circuit diagram illustrating the electronic movement of an electronic wristwatch constructed in accordance with the prior art.

The polarity of the stator poles is alternately reversed in response to alternating the application of the same drive signal to terminals 4a and 4b of drive coil 4. The drive signal is produced by a conventional electronic timepiece movement, of the type illustrated in FIG. 2. Specifically, a high frequency time standard, such as quartz crystal vibrator 10, is coupled to an oscillator circuit for producing a high frequency time standard signal $f_n$. A divider circuit 12, comprised of a plurality of series-connected divider stages, is adapted to receive the high frequency time standard signal produced by the oscillator circuit 11, and produce a low frequency timekeeping signal $f_0$ in response thereto. A wave shaping circuit 13 receives the low frequency timekeeping signal $f_0$ and applies, through leads 16 and 17 and amplifiers 14 and 15, respectively, pulse signals that are alternately applied to the drive coil 4 to thereby induce an alternating polarity signal of specific duration every second.

Specifically, a drive signal having a pulse width of 7.8 m-sec., in duration, is applied every two seconds to the input terminal 16 of C-MOS inverter amplifier 14 and, hence, to the input terminal 4a of the drive coil 4. Additionally, every two seconds, a driving signal having a pulse width of 7.8 m-sec., in duration, is applied to input terminal 17 of C-MOS inverter 15 and, hence, to terminal 4b of the drive coil 4, to thereby alternately induce, in the drive coil 4, a driving pulse of alternating direction to thereby reverse the polarities of the stator poles of the step motor with respect to each other once each second.

Figure 3:
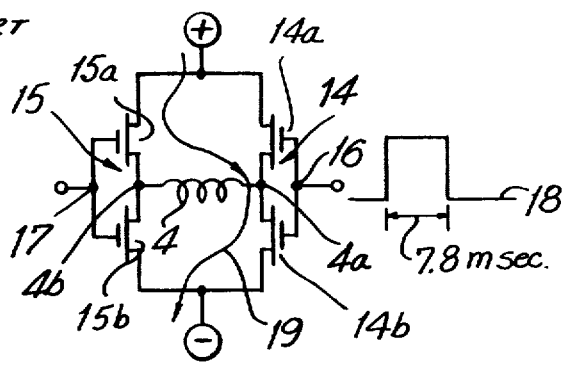
FIG. 3 is a detailed circuit diagram of a step motor driving circuit constructed in accordance with the prior art.

Referring specifically to FIG. 3, a step motor driving circuit, of the type utilized to drive the step motor depicted in FIG. 1, is illustrated. When, for example, a drive signal 18, having a 7.8 m-sec. duration, is applied to input terminal 16 of C-MOS inverter 14, a current flow in the direction indicated by the arrowed line 19 is effected from the positive terminal through the transistor 15a, drive coil 4, transistor 14b and the negative terminal. Alternatively, when a drive signal having a 7.8 m-sec. duration is applied to the input terminal 17, the current flow that is symmetrical to the current flow described above, when the drive signal is applied to the input terminal 16, is effected. Accordingly, the current flow and, hence, polarity of the pulse signal induced in the drive coil 4 is alternated in response to the pulses of the drive signals being alternately applied to the input terminals 16 and 17 of the driver circuit. If the signals applied to the drive coil 4 have a pulse width of 7.8 m-sec. in duration, an opposite polarity drive signal, having a pulse duration of 7.8 m-sec., will be alternately induced in the drive coil 4 of the step motor in the manner noted above.

In response to each opposite polarity pulse, induced in the drive coil 4, rotor 1 is stepped through a rotation of 180°. The rotation of the step motor is transmitted through a pinion 1a to an intermediate wheel 6. The rotation of the intermediate wheel 6 is, in turn, transmitted through the intermediate wheel pinion 6a to the fourth wheel 7 and, hence, through the fourth wheel pinion 7a to the center wheel 8 and center wheel pinion 8a. The center wheel pinion 8a, in turn, transmits an incremental rotary motion to a cannon-pinion wheel 9. Cannon-pinion wheel 9 advances timekeeping wheels (not shown), a calendar mechanism (not shown) and any other wheels that are required to effect a display of time information.

Heretofore, improvements in the prior art step motor, depicted in FIG. 1, have been directed to the specific construction thereof. For example, reductions in the inner diameter of the portions of the stator poles surrounding the rotor, changes in the eccentric positioning of the stator poles with respect to each other, defined by the offset x, and variations in the diameter of the rotor, or any combination of these features, have been attempted, in an endeavor to increase the converting efficiency of the motor and/or reduce the current consumption thereof during operation. However, such improvements have been based on the rotor being incrementally rotated in a fixed direction, and as is detailed below, methods for effecting a reversal in the direction of the rotor in the step motor, depicted in FIG. 1, have been less than completely satisfactory.

As aforenoted, the rotor is maintained at a rest or stable position, which stable position is determined by the offset X of the stator poles 2 and 3. Moreover, the rotational direction of the rotor is determined by the amount that the stator poles are offset with respect to each other in order to effect a rotation of the rotor in the direction of the arrow, depicted in FIG. 1. Accordingly, if the offset of the stator poles 2 and 3 is reversed, the direction of rotation of the rotor will also be reversed. By permitting a reversal of the offset between the stator poles to be effected from without the electronic wristwatch movement, operation of the step motor in two rotational directions could be effected. Nevertheless, such an approach is unacceptable for two reasons.

First, in order to obtain a high operating efficiency and, at the same time, consume little power, the eccentric offset x, between the stator poles 2 and 3, must be on the order of 50μ, with a tolerance of no more than 10μ accepted. In order to obtain these tolerances, it is imperative that the stator construction of the step motor be highly toleranced and securely fixed to a mounting plate during assembly. Such tolerances could not be maintained if the stator plates are permitted to be displaced with respect to each other. Secondly, as a practical matter there is no easy way to effect such displacement of the stator poles with respect to each other, once the electronic wristwatch is fully assembled.

Alternatively, two drive coils can be wrapped around the stator coils, a first drive coil having a first magnetic orientation for incrementally rotating the step motor in a first direction, and a second drive coil having an opposite magnetic orientation for incrementally rotating the rotor in the opposite direction. Also, two pairs of stators can be provided thereby making it necessary to provide but a single drive coil. However, the use of two drive coils, or two distinct stator arrangements, would increase the size of the step motor and thereby prevent same from being utilized in a small-sized electronic wristwatch movement. Thus, none of the approaches detailed above are capable of obtaining incremental rotation of the rotor in a highly efficient manner without obtaining an increase in current consumption so that a two directional step motor can be incorporated into an electronic wristwatch in a practical manner.

Figure 4:
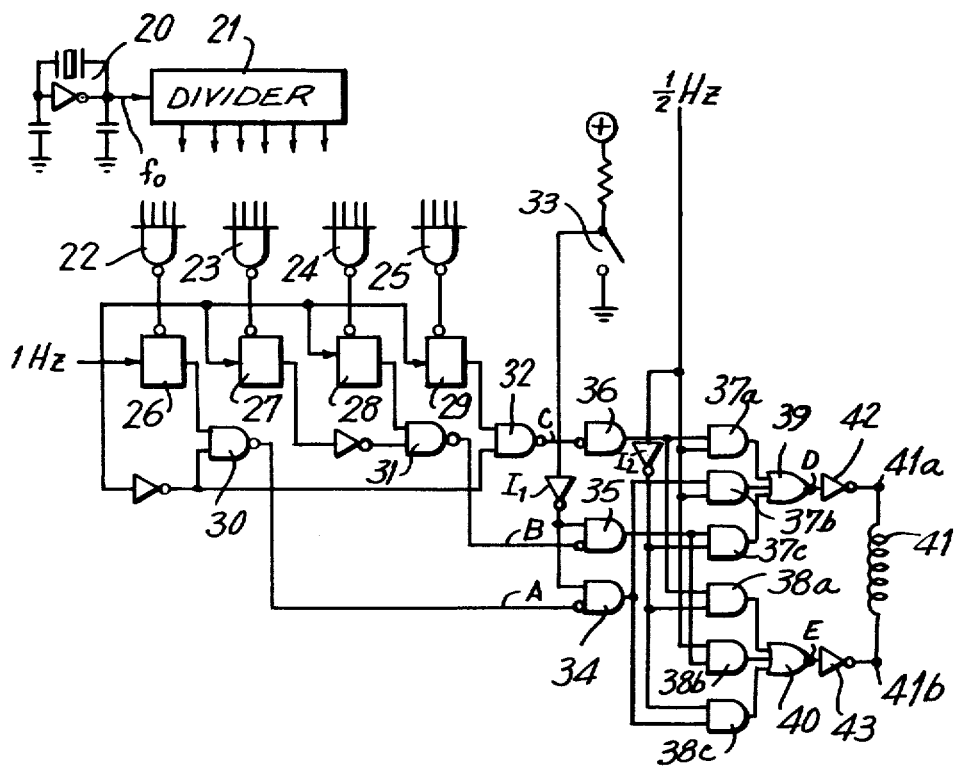
FIG. 4 is a circuit diagram of a step motor driving circuit constructed in accordance with a preferred embodiment of the instant invention.

Reference is now made to FIG. 4, wherein a step motor driving circuit, constructed in accordance with the instant invention for effecting incremental driving of the prior art step motor, depicted in FIG. 1, in a first rotational direction and in a reverse rotational direction, is depicted. As is detailed in FIG. 4, an oscillator circuit 20, including a quartz crystal vibrator as a high frequency time standard, is adapted to apply a high frequency time standard signal $f_0$ to a divider circuit 21 comprised of a plurality of series-connected binary divider stages. Each of the divider stages of divider 21 produces an intermediate frequency signal with each successive divider stage producing an intermediate frequency signal that is substantially half the frequency of the preceding divider stage. The intermediate frequency signals, produced by the divider stage, are respectively applied to NAND gates 22 through 25 of the step motor driving circuit in order to produce signals for effecting a forward incremental rotation of the step motor, or a reverse incremental rotation of the step motor in a manner to be discussed in greater detail below.

Specifically, NAND gate 22 is coupled through a delay flip-flop 26 to a NAND gate 30. NAND gate 30 is, in turn, coupled through an AND gate 34, which AND gate is part of a mode select circuit, to be described in detail below. Similarly, NAND gate 23 is coupled through delay flip-flop 27 and an inverter to NAND gate 31, which NAND gate is coupled to AND gate 35 of the mode select circuit. NAND gate 24 is coupled through delay flip-flop 28 and NAND gate 31 to NAND gate 35 of the mode select circuit. Finally, NAND gate 25 is coupled through delay flip-flop 29 and NAND gate 32 to AND gate 36 of the mode select circuit. The respective AND gates 34, 35 and 36 of the mode select circuit are, in turn, coupled through AND gates 37a, 37b and 37c and AND gates 38a, 38b and 38c of the driving circuit to thereby apply through OR gates 39 and 40 and inverters 42 and 43, respectively, drive signals to both terminals 41a and 41b of drive coil 41.

Figure 5:
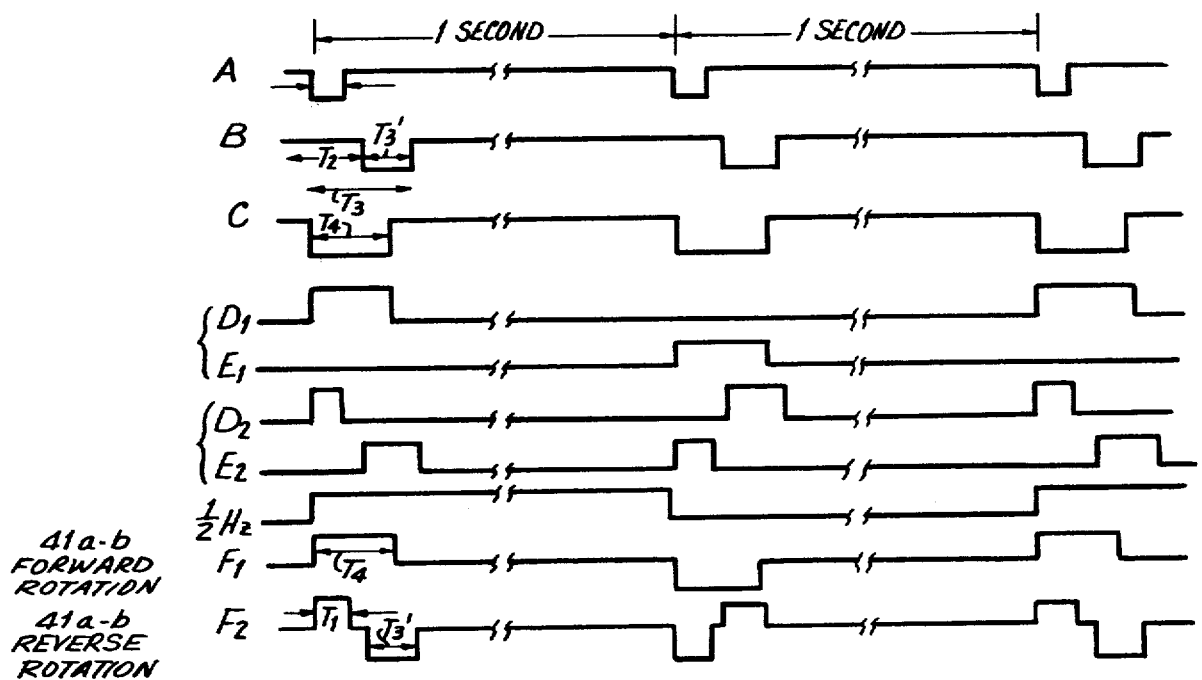
FIG. 5 is a wave diagram illustrating the operation of the step motor driving circuit depicted in FIG. 4.

In operation, NAND gate 22 is provided for forming a first reverse driving signal, which pulse is applied to delay flip-flop 26. NAND gates 23 and 24 are utilized to apply pulses through delay flip-flops 27 and 28 respectively to NAND gate 31 for the purpose of synthesizing a second reverse driving signal. NAND gate 25 produces the forward driving signal for operating the step motor in a forward direction, in the usual manner. Specifically, as is illustrated in FIG. 5, each of the NAND gates 22, 23, 24 and 25 produce signals ($T_1$, $T_2$, $T_3$, $T_4$) which signals have a leading edge that occurs after the leading edge of the one second signal produced by the last series-connected divider stage in divider 21. By this arrangement, the delay flip-flops 26, 27, 28 and 29, respectively coupled to NAND gates 22, 23, 24 and 25, receive the one second signal (1 Hz) and produce output signals that are delayed in accordance with the signals $T_1$, $T_2$, $T_3$ and $T_4$ respectively applied thereto.

Accordingly, as illustrated in FIG. 5, a signal A having a leading edge that occurs $T_1$ m-sec. after the leading edge of the 1 Hz signal is applied to delay flip-flop 26, is produced at the output of NAND gate 30. Similarly, a signal B having a pulse width $T_3 - T_2 = T'_3$ is produced at the output of NAND gate 31 $T_3 - T_2$ seconds after the leading edge of the 1 Hz signal, and a signal C having a leading edge that occurs $T_4$ m-sec. after the application of the 1 Hz signal applied to delay flip-flop 29 is produced at the output of NAND gate 32.

A two-position mode select changeover switch 33 is coupled to a first input of AND gate 36 and is further coupled through an inverter $I_1$ to a first input of AND gates 35 and 34, to thereby select either a forward driving mode or a reverse driving mode, in a manner to be discussed in greater detail below. When changeover switch 33 is disposed in an open position, in order to dispose the mode select circuit in a forward driving mode, the first input of AND gate 36 is referenced to a HIGH potential, and the first inputs to the AND gates 35 and 34 are referenced to LOW potentials. Accordingly, by referencing the first input of AND gate 36 to a HIGH potential, the forward drive output signal C, produced at the output of NAND gate 32 and applied to the second input of AND gate 36, is transmitted through the AND gate 36 to the first inputs of AND gates 37a and 38a. At the same time, the referencing of the first input terminals of AND gates 35 and 34, to a LOW potential, prevents the first reverse driving signal A and the second reverse driving signal B from being transmitted through AND gates 34 and 35, respectively. A one-half Hz signal is applied to the second inputs of AND gates 37a, 37b and 38b. Additionally, the one-half Hz signal is applied through an inverter to the second input of AND gate 37c, 38a and 38c. Accordingly, when changeover switch 33 is disposed in a forward mode, as aforenoted, forward drive signal C is applied through AND gate 36 to AND gates 37a and 38a to thereby respectively apply, at the outputs of OR gates 39 and 40, forward driving signals $D_1$ and $E_1$, illustrated in FIG. 5. Forward drive signals $D_1$ and $E_1$ are therefore applied to terminals 41a and 41b of drive coil 41, to thereby effect an incremental rotation of the rotor once every second, in the manner described above with respect to the prior art step motor, depicted in FIGS. 2 and 3. Specifically, a driving pulse $F_1$, having alternating polarity pulses of a duration equal to $T_4$ m-sec., is induced in the drive coil 41 once every second in order to effect the usual forward incrementation of the rotor in the usual manner.

When changeover switch 33 is disposed in a closed position, the mode select circuit is disposed in a reverse driving mode. Specifically, the first input of AND gate 36 is referenced to a LOW potential and the first inputs of AND gates 34 and 35 are referenced to HIGH potential, thereby opening AND gates 34 and 35 to permit first reverse driving signal A and second reverse driving signal B to be transmitted through AND gates 34 and 35, and prevent forward driving signal C from being transmitted through AND gate 36. After being transmitted through AND gates 34 and 35, first reverse driving signal A is applied to the first input of AND gate 37b and the first input of AND gate 38c. Similarly, the second drive signal B is applied through AND gate 35 to the first input of AND gate 37c and to the first input of AND gate 38b. At the same time, the one-half Hz signal is also applied to AND gates 37b, 37c, 38a and 38c to thereby produce, at the outputs D and E, of OR gates 39 and 40, reverse mode driving signals $D_2$ and $E_2$, illustrated in FIG. 5. Signals $D_2$ and $E_2$ are applied through driving inverters 42 and 43 to the terminals 41a and 41b of drive coil 41 to thereby produce therein the drive signal $F_2$, illustrated in FIG. 5, which signal effects an incremental rotation of the rotor of the step motor in a reverse direction in the following manner.

When the pulse, having a duration $T_1$, of signal $D_2$, is applied at terminal 41a, a current flow from terminal 41a of the drive coil to terminal 41b is first effected, whereafter the pulse $E_2$, having a period $T'_3$, is applied to terminal 41b, to thereby effect an opposite current flow through the coil 41. After one second has elapsed, the pulse from the drive signal $E_2$ is applied to terminal 41b to thereby produce a negative going polarity signal having a duration $T_1$, and immediately thereafter, the signal from $D_2$ is applied to terminal 41a of drive coil 41 in order to produce a positive going pulse having a duration $T'_3$. Thereafter, as long as the changeover switch is disposed in a closed position, and hence in a reverse mode, the polarity of each pair of pulses produced in sequence every second is reversed from the polarity of the pulses induced in sequence in the drive coil during the preceding second. Accordingly, if the pulses $T_1$ and $T'_3$ are provided with a sufficient pulse width and are produced in the sequence, illustrated in signal $F_2$ of FIG. 5, the rotor is rotated in the reverse direction, in the manner detailed below.

As aforenoted, the pulse width $T_4$ of the forward driving signal is on the order of 7.8 m-sec. in order to effect an incremental rotation of the rotor once each second in a forward direction. Accordingly, the pulse width of $T_1$ is selected to be narrower than the 7.8 m-sec. pulse width $T_4$ and, in fact, is selected to be just insufficient for effecting an incremental forward rotation of the rotor. In an exemplary embodiment, $T_1$ should be on the order of 3 m-sec.

Accordingly, when the drive signal includes a 3 m-sec. drive pulse $T_1$, the rotor is advanced in the forward direction when the signal $T_1$ is applied thereto. However, because of the short duration of the pulse $T_1$, there is an insufficient force generated to complete the incremental rotation of the rotor through the entire 180°. As illustrated in FIG. 1, a permanent magnet rotor 1 admits of a neutral position NP, which position is a little bit less than 90° from the static stable position of the rotor (the normal orientation of the magnetic pole at the time that the motor is not driven). Accordingly, if the pulse applied to the drive coil is sufficient to rotate the rotor past the neutral position NP, the rotor will then be stepped through the 180° rotation without any further force being applied thereto. However, if an insufficient force is applied to the rotor to permit same to be rotated past the neutral position NP, the rotor will then be returned to its static stable position. This is the condition that occurs when the pulse $T_1$ is applied to the rotor. Specifically, the pulse $T_1$ is applied to the rotor and is of insufficient duration to rotate the rotor past the NP position, and hence once the drive pulse $T_1$ is no longer applied to the drive coil, the rotor returns to its static stable position.

Figure 6:
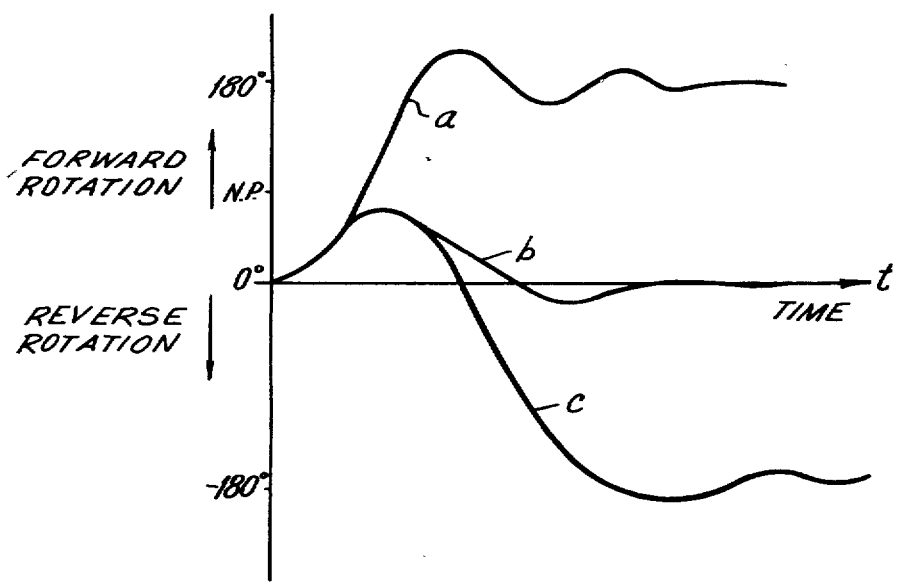
FIG. 6 is an illustration of the movement of a rotor in accordance with the operation of the step motor driving circuit depicted in FIG. 4.

This relationship is illustrated in FIG. 6, wherein curve a illustrates the manner in which a rotor is rotated in a forward direction when a drive pulse, having a 7.8 m-sec. duration, is applied to the drive coil. In response to the 7.8 m-sec. drive pulse, the rotor is rotated in a forward direction and comes to rest 180° out of phase. However, curve b illustrates the operation of the rotor, when a drive signal, having a pulse width $T_1$ of 3 m-sec. duration, is applied to the drive coil. In such case, the rotor cannot rotate past the neutral position NP and, hence, is returned to its original 0° starting position. Accordingly, in the driving circuit of the instant invention, if a drive pulse, having a duration equal to $T'_3$ of opposite polarity to drive pulse $T_1$, is applied to the drive coil immediately after pulse $T_1$ is applied thereto. The pulse $T'_3$ will effect a rotation of the rotor through 180° in the reverse direction, as is illustrated by curve c in FIG. 6. The rotor is rotated in a reverse direction in response to the cumulative effect of the return of the rotor toward the 0° position in combination with the opposite polarity drive pulse $T'_3$ applied thereto. In the exemplary embodiment, illustrated in FIG. 5, pulse width $T_2$ and $T'_3$ respectively equal 4.5 m-sec. and 4.5 m-sec.

Accordingly, when the step motor driving circuit, depicted in FIG. 4, is utilized with a step motor of the type depicted in FIG. 1, reverse rotation of the rotor is effected in the following manner. The drive pulse $T_1$ is provided with a minimum value of 2 to 3.5 m-sec. and the maximum value of $T_2$ is selected to have a minimum value of 2 to 3.5 m-sec. and a maximum value of 6 m-sec. $T'_3$ is selected to be within the range of 3.5 to 6 m-sec. Accordingly, the output torque at the time of reverse rotation is on the order of $\frac{1}{4}$ to $\frac{1}{2}$ the output torque at the time of forward rotation. Thus, the range of voltage required to effect rotation of the rotor in the reverse direction is slightly less than the range required to effect rotation of the rotor in the forward direction. It is noted, however, that the performance of the motor when the rotor is rotated in a reverse direction is slightly inferior to the operation of the motor when the rotor is rotated in a forward direction. Moreover, when the electronic wristwatch is disposed in a normal forward mode of operation, the step motor operates in the usual manner and is only disposed in a reverse rotation mode when a special function or type of operation is desired. Accordingly, an electronic wristwatch need only provide normal driving under all operating conditions likely to be experienced, such as low temperatures, magnetic fields, external shocks, etc., while reverse rotational operation can be limited to more ideal operating conditions. Thus, the step motor driving circuit detailed above is capable of providing efficient driving of the step motor in a forward direction under all conditions, and additionally reverse driving under normal operating conditions, thereby rendering same particularly advantageous for use in miniaturized electronic wristwatches.

It is further noted that the step motor driving circuit of the instant invention is not limited to the prior art step motor construction, depicted in FIG. 1, and can be applied to all step motors of the type that have been incorporated into electronic wristwatches. Nevertheless, as the construction of the step motor changes, the specific duration of the pulse widths ($T_1$, $T_2$, $T'_3$, etc.) must be varied to accommodate the specific construction of the motor. For example, the driving circuit of the instant invention can be utilized with a step motor having a six-pole rotor or to a step motor having a rotor that is axially aligned with a stator pole and is controlled in accordance with axial magnetic fields disposed therebetween. Also, a step motor driving circuit of the instant invention can be utilized with a step motor wherein the rotor is held by a coil. In each of these cases, the step motors are inverting pulse motors in which the flow of driving current is reciprocally effected in opposite directions through the coil each time the motor is stepped. Thus, in a step motor wherein a current flow is effected in the same direction for each stepping of the rotor, reverse rotation of the rotor can be effected by applying the second pulse ($T'_3$) for positioning the rotor in a series manner.

It is noted that a step motor, capable of being rotated in a forward and reverse direction, can be utilized to provide numerous functions in an electronic wristwatch. For example, when the time displayed by an electronic wristwatch is adjusted, and in particular the second hand is corrected to exact time, if the second hand displays the time past the exact time, such adjustment can be easily performed by operating the step motor in a reverse direction to thereby return the second hand to the exact time. In such case, time adjustment can be effected by increasing the speed of operation of the motor and thereby eliminating the delay that occurs in the usual ordinal type watch operation, to wit, one step of the rotor for each second of time elapsed. In order to obtain the adjustment noted above, the driving circuit, depicted in FIG. 4, need only be slightly modified. Moreover, further types of time correction particularly for correcting the second hand and utilizing the driving circuit of the instant invention by effecting rotation of the second hand in two directions is provided by the instant invention. Also, when multi-time display, rest-time display and other such time measuring functions are provided in an electronic wristwatch, such operation can be effected by utilizing a two directional step motor driving circuit of the type to which the instant invention is directed. Moreover, the step motor driving circuit of the instant invention is also applicable to other electronic measuring instruments.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a step motor including a magnetic permeable stator means, a drive coil coupled to said stator means for magnetically orienting said stator means into different magnetic orientations in response to a drive signal being applied thereto, and a permanent magnet rotor means adapted to be rotated in response to changes in the magnetic orientation of the stator means, the improvement comprising drive circuit means coupled to said drive coil, said drive circuit means being disposable into a first mode for alternately applying to said drive coil a first drive pulse and a second drive pulse, each said first and second drive pulse having a duration sufficient to rotate said rotor means by a single step for effecting a periodic rotation of said rotor in a first rotational direction, said drive circuit means being disposable into a second mode for applying to said drive coil a third drive pulse having a duration that is insufficient to effect rotation of said rotor means in a first direction by a single step in response to said third pulse being applied to said drive coil, and a fourth drive pulse immediately after said third drive pulse, said fourth drive pulse having a duration larger than the duration of said third pulse to effect a periodic rotation of said rotor in the other rotational direction, in response to said fourth drive pulse being applied to said drive coil, and mode select means coupled to said drive means for selectively disposing said drive means into one of a first and second mode to thereby select the direction of rotation of said rotor.

2. A step motor as claimed in claim 1, wherein said drive coil includes first and second terminals, said driving means being coupled to said first and second terminals of said drive coil.

3. A step motor as claimed in claim 2, wherein said second pulse has the same duration and polarity as said first pulse, said first and second pulses being alternately applied to said respective first and second terminals of said drive coil in order to effect an incremental rotation of said rotor in a first direction in response to said first and second pulses being alternately applied to said drive coil.

4. A step motor as claimed in claim 3, wherein said fourth pulse has the same polarity as said third pulse, said drive circuit means being adapted to alternately and respectively reverse the application of said third and fourth pulses, in sequence, to said first and second terminals of said drive coil and then to said second and first terminals of said drive coil to effect an incremental rotation of said rotor in a second direction, in response to each application of said third and fourth pulses, in sequence, to said drive coil.

5. A step motor as claimed in claim 3, wherein said fourth pulse having a duration shorter than the duration of said first and second pulses.

6. A step motor as claimed in claim 4, wherein said driving means includes a first signal processing means coupled to said first terminal of said drive coil and second signal processing means coupled to said second terminal of said drive coil, said first and second signal processing means being adapted to receive a periodic frequency signal, and in response to each leading edge of said periodic frequency signal, said first signal processing means and second signal processing means are adapted to respectively alternately apply said first pulse to said first terminal of said drive coil and said second pulse to said second terminal of said drive coil.

7. A step motor as claimed in claim 6, wherein said first signal processing means and second signal processing means are further adapted in response to detecting the leading edge of said periodic frequency signal applied thereto, when said driving means is disposed in a second mode to respectively apply said third pulse and said fourth pulse, in sequence, to said first and second terminals of said drive coil, and thereafter, in response to the next leading edge of periodic frequency signals respectively apply said fourth pulse and third pulse, in sequence, to said first and second terminals of said drive coil.

8. A step motor as claimed in claim 7, and including logic means for receiving a plurality of high frequency signals, each having a different frequency, and in response thereto for producing a first reverse signal and a second reverse signal and a forward signal, said first reverse signal, second reverse signal and forward signal having the same frequency and different duty cycles, said first and second reverse signals being applied to said first and second signal processing means in order to produce said third and fourth pulses produced thereby, said forward signals being applied to said first and second signal processing means to produce said first and second drive pulses produced thereby.

9. A step motor as claimed in claim 8, wherein said mode select means includes gating means disposed intermediate said logic means and said first signal processing means and second signal processing means, said mode select means being adapted to dispose said gating means to apply said forward signal to said first and second signal processing means to thereby dispose said driving means in a first mode, said gating means being further adapted to apply said first and second reverse signals to said first and second signal processing means to thereby dispose said driving means into a second mode.

10. In a step motor including a magnetic permeable stator means, a drive coil coupled to said stator means for magnetically orienting said stator means into different magnetic orientations in response to a drive signal being applied thereto, and a permanent magnet rotor means adapted to be rotated in response to changes in the magnetic orientation of the stator means, the improvement comprising drive circuit means coupled to said drive coil, said drive circuit means being disposable into a first mode for alternately applying to said drive coil a first drive pulse and a second drive pulse, each said first and second drive pulse having a predetermined amplitude and a duration sufficient to rotate said rotor means by a single step for effecting a periodic rotation of said rotor in a first rotational direction, said drive circuit means being disposable into a second mode for applying to said drive coil a third drive pulse having said predetermined amplitude and a duration that is insufficient to effect rotation of said rotor in said first rotational direction in response to said third pulse being applied to said drive coil and a fourth drive pulse immediately after said third drive pulse, said fourth drive pulse having said predetermined amplitude and a sufficient duration to effect periodic rotation of said rotor in the other rotational direction, and mode select means coupled to said drive means for selectively disposing said drive means into one of a first and second mode to thereby select the duration of rotation of said rotor.

* * * * *